Feb. 16, 1971
D. MELNICK
3,563,768
CONVENIENTLY PACKAGED SOUP PRODUCT
Filed Aug. 31, 1967
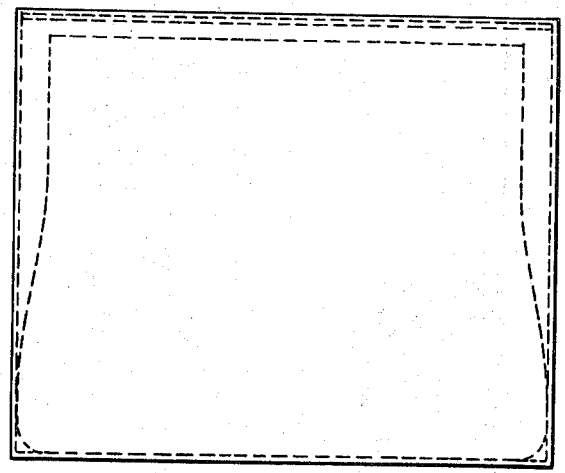
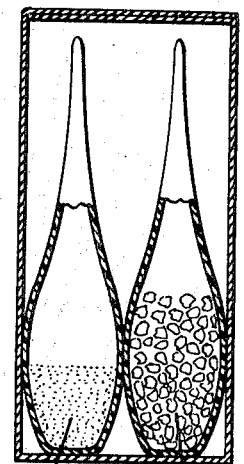
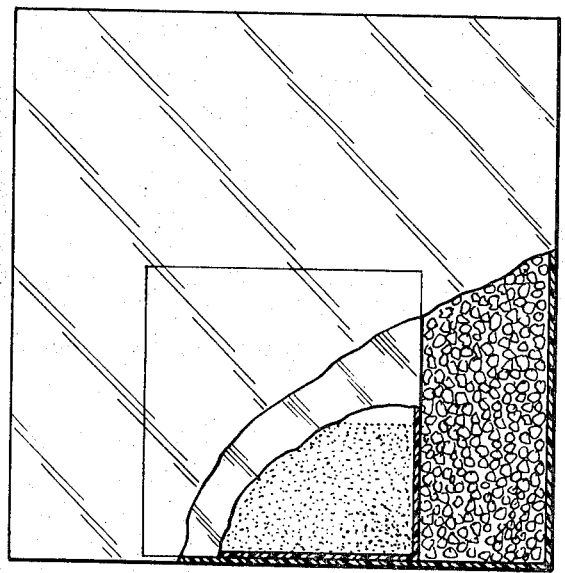
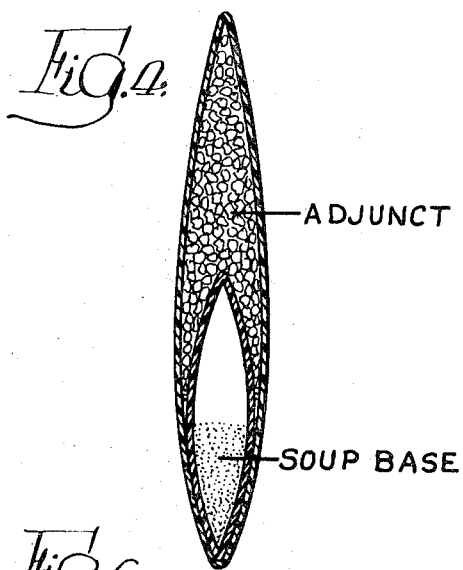
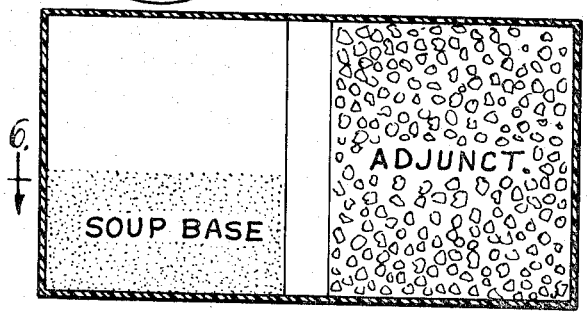
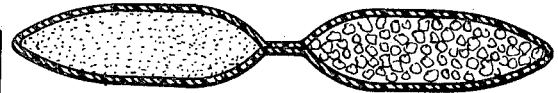
Inventor:—
Daniel Melnick,
By Martha A. Michaels Agent.

United States Patent Office 3,563,768
Patented Feb. 16, 1971

3,563,768
CONVENIENTLY PACKAGED SOUP PRODUCT
Daniel Melnick, Teaneck, N.J., assignor to CPC International Inc., New York, N.Y., a corporation of Delaware
Filed Aug. 31, 1967, Ser. No. 664,831
Int. Cl. A23l 1/40
U.S. Cl. 99—124                                8 Claims

ABSTRACT OF THE DISCLOSURE

The present invention relates to a conveniently packaged soup product for mixture and rehydration to form an instantly consumable serving. The package may be in unit or multi-unit consumption form and contains (a) a sealed, substantially moisture-proof package containing an easily rehydratable dry food material of small particulate size, and (b) a sealed, substantially moisture-proof package containing a ready-to-eat moist food adjunct of gross particulate size which is in microbiologically and organoleptically stabilized form requiring no further hydration. The amounts in each package are compatible to permit their use together in a predetermined quantity of hot water.

---

The easily rehydratable dry food material is a dry soup base. The gross particulate ready-to-eat moist food adjunct is preferably a moist ready-to-eat supplement such as cooked pasta, cooked moist vegetables, cooked beef or ham chunks or the like.

In a typical example for use by the consumer the soup base package and the moist ready-to-eat food adjunct package are opened and both are mixed with hot water to provide an instantly consumable serving of soup.

The moist ready-to-eat food adjunct is stabilized by the addition of a fungistat such as sorbic acid and an acid material such as vinegar. In addition, if desired, a metal chelating agent such as an ethylenediaminetetraacetic acid component may be added. The stabilizing agents are evenly distributed throughout the solid components which comprise the moist ready-to-eat food adjunct.

The package is preferably made of a heat sealable film such as polyethylene film or saran or the like.

This invention relates to a conveniently packaged food product for mixture and rehydration to form an instantly consumable serving of soup. More particularly, the invention relates to a conveniently packaged soup product packed in unit or multi-unit consumption form wherein the food products are packaged in two moisture-proof package containers, one containing dry, rehydratable food material of small particulate size (soup base) and the other containing moist ready-to-eat gross particulate food material in microbiologically and organoleptically stabilized form requiring no further hydration.

Soup products are consumed in vast quantities by the general populace throughout the world. Basically, there are two types of soup products; First, the moist, canned soup product which is condensed so that upon addition of an equal amount of water or milk and heating an edible product is obtained; Second, the dehydrated soup products to which a large quantity of water is added and generally a cooking time varying from five minutes to one-half hour is required.

The packing of condensed soups in tin cans may be an expensive operation. For example, in the United States tin cans are still regarded to be an economical method of packaging, whereas in Europe and many other countries the tin can is entirely too expensive to be used in this manner. The packing of dehydrated soups in flexible moisture resistant packaging is an inexpensive method and reduces costs on shipping but an attendant disadvantage of dehydrated soups heretofore is the objectionably long rehydration and cooking time. Frequently upon rehydration from the dehydrated state, vegetables, pasta products, and so forth are not as desirable as when fresh.

It is an object of the present invention to provide an instant soup product containing gross food particles, which is instantly ready for consumption.

It is another object of the present invention to provide a conveniently packaged soup product containing gross food particles, which package is in unit or multi-unit consumption form.

It is a still further object of the present invention to provide a conveniently packaged soup product containing gross food particles for mixture and rehydration to form an instantly consumable serving.

It is a further object of the present invention to provide an instant food product wherein the gross food particles have been treated to be rendered stable against microbiological deterioration and/or flavor deterioration.

It is yet another object of the present invention to provide a conveniently packaged soup product containing gross food particles, that is packaged in individual substantially moisture-proof pouches, and that is suitable for the preparation of an edible instantly consumable product by easy manipulation.

It is a still further object to provide a soup product containing gross food particles packaged and marketed in the economical manner characteristic of dehydrated soups and having convenience-in-use at least equal to that characteristic of canned ready-to-eat soups.

Other objects and advantages of the present invention will be apparent hereinafter from the specification and from the appended claims.

In the drawings:

FIG. 1 is a side elevation of a cardboard carton for holding pouch containers of food components packaged in accordance with this invention;

FIG. 2 is a transverse section taken on the line 2—2 of FIG. 1 looking in the direction of the arrows, and showing two pouches of food products within the carton prepared in accordance with one embodiment of the invention;

FIG. 3 is a side elevation view of a package prepared in accordance with another embodiment of the invention, showing an exterior pouch containing within it both the food product and a smaller pouch, the view being partly broken away to show the smaller pouch and its contents;

FIG. 4 is a transverse section taken on the line 4—4 of FIG. 3, looking in the direction of the arrows, and showing the interior smaller pouch within the exterior larger pouch;

FIG. 5 is a side elevation of a package in which two separate pouches are united so as to provide a unitary package; and FIG. 6 is a transverse section taken on the line 6—6 of FIG. 5, looking in the direction of the arrows, and showing one overall pouch divided into two sections prepared in accordance with one embodiment of the invention.

The present invention provides a conveniently packaged food for mixture and rehydration to form an instantly consumable serving of soup comprising:

(a) the soup base—an easily rehydratable dry food material of small particulate size packed in a moisture-proof sealed package, and
(b) the adjunct—a moist, ready-to-eat food adjunct of gross particulate size packed separately in a moisture-proof sealed package, said food adjunct being microbiologically and organoleptically stabilized and requiring no further hydration, the amount in each of said packages being compatible to permit their use together in a predetermined quantity of hot water.

The easily rehydratable dry food material of small particulate size is a soup base. The particle size of the soup base is less than 2 millimeters and preferably less than 1 millimeter. The soup base mixture is readily water dispersible and readily rehydrated or dissolved.

The moist, ready-to-eat food adjunct of gross particulate size which has been rendered microbiologically and organoleptically stabilized is preferably selected from the group consisting of cooked potatoes, vegetables, noodles, pasta, or a product such as beef chunks, other meat material or a meat analog. In each case, the gross particulate size material has a particle size, in its maximum dimension, greater than 3 millimeters and generally greater than 5 millimeters while in its minimum dimension it is less than 5 millimeters and preferably less than 3 millimeters.

The present invention may be more easily understood if the various components are discussed individually as follows:

REHYDRATABLE DRY FOOD MATERIAL

The soup base

A typical dry soup base suitable for use in the present invention contains dry particulate material having a particle size less than 2 millimeters and preferably less than 1 millimeter. The dry particulate material has a moisture content less than 5% and preferably less than 3%. Typical constituents include dextrose, or other sugar, monosodium glutamate, vegetable protein hydrolysate, animal fat and hydrogenated oil, salts, spices, flavoring ingredients, and an alkalizing agent. The alkalizing agent is present in sufficient quantity to substantially neutralize the acid in the moist ready-to-eat food adjunct. The dry materials are blended in such a manner as to produce a composition exemplified as follows:

| Ingredients: | Parts by wt. |
|---|---|
| Dextrose and/or other sugars | 32 |
| Monosodium glutamate | 15 |
| Vegetable protein hydrolysate | 2 |
| Animal fat and hydrogenated oil | 20 |
| Salt, spices and flavoring ingredients | 24 |
| Trisodium phosphate | 7 |

Because of the alkalizing agent, such as trisodium phosphate, trisodium citrate and the like, the other dry ingredients should be low in moisture content to prevent saponification of the fat and acceleration of the browning reaction, i.e., reaction of reducing sugars with compounds having free amino groups. In order to maintain low moisture it is preferred to use the dextrose, or other sugars, and the monosodium glutamate in anhydrous form. The alkalizing agent is added in such quantity as to provide the final soup with a pH of at least 5.

As mentioned heretofore, a soup base of this nature is instantly rehydratable in water. Upon addition of the soup base to a bowl of hot water, an instant soup material is obtained which approximates in appearance and flavor the well known soup called consommé or a cream consommé.

FOOD OF GROSS PARTICULATE SIZE

The adjunct

The moist, ready-to-eat food adjunct of gross particulate size is in a stabilized, ready-to-eat form. The food has been microbiologically and organoleptically stabilized. No further hydration is required. Examples of this adjunct include pasta products such as noodles or the like, potatoes, vegetables, or meat products such as beef chunks, a ham analog, or the like.

The gross particulate food adjunct has a particle size in its maximum dimension in excess of 3 millimeters and preferably in excess of 5 millimeters, whereas the minimum dimension is less than 5 millimeters and preferably less than 3 millimeters. The lesser size of the minimum dimension allows substantially complete permeation by the stabilizing compounds while at the same time allowing substantial permeation by the alkalizing agent present in the dry food material upon mixing with hot water when used by the consumer.

Stabilization against microbiological or organoleptic deterioration is effected by the addition of an edible fungistat and a food acid to achieve a pH less than 4.5. Optionally, a water soluble metal chelating agent such as an ethylenediaminetetraacetic acid component may be added in small quantities. The ethylenediaminetetraacetic acid component includes the free acid, calcium, sodium and other potentially active edible salts. Suitable fungistats include organic free carboxylic acids, their alkyl esters where the alkyl radical contains 1 to 5 carbon atoms and their edible alkali metal and alkaline earth metal salts. Examples of such acids are crotonic, sorbic, benzoic, and parahydroxy benzoic acid and the like. Suitable edible acids include vinegar, acetic acid, and lactic and/or citric acid, in limited quantities. The suitable water soluble metal chelating agents, which may optionally be added, include amino carboxylic acids such as ethylenediaminetetraacetic acid, polycarboxylic acids such as succinic acid, hydroxy acids such as citric acid, polyhydroxy compounds such as inositol, and amino acids such as glutamic acid and aspartic acid and their salts. In some cases the metal chelating agent is not required, viz., in the preparation of the cooked pasta while in other cases this stabilizing agent is mandatory, viz, in the preparation of the cooked vegetables and/or meats.

It has been found that the combination of the fungistat, edible acid and water soluble metal chelating agent is exceptionally useful in preventing deterioration of the moist ready-to-eat food adjunct. Neither the fungistat nor the metal chelating agent alone produces as satisfactory a result as the combination with the edible acid. The water soluble metal chelating agent is genearlly used in the food in the amount of about 0.0004% to about 2% by weight. The quantity of the fungistat used in the food depends on the fungistat used. For example, fungistats of the sorbic acid and benzoic acid type are present in the food in amounts from about 0.015% to about 0.02% by weight, preferably about 0.05% to about 0.15% by weight, whereas fungistats of the propionic acid type require somewhat higher concentration in the foods, usually in amounts of from about 0.15% to about 0.3%. The edible acid is added in an amount sufficient to lower the pH to less than 4.5, preferably to a pH of less than about 4.2.

A preferred method of preparing the moist, ready-to-eat food adjacent is to cook the foodstuff in an aqueous medium containing the fungistat, edible acid, and water soluble metal chelating agent. After the vegetable, meat or pasta product has been sufficiently cooked, excess moisture is drained and the cooked product is packed hot. By packing and sealing the package while the product is still hot, heat pasteurization is effected. Preferably, the temperature will exceed about 150° F. The moist material may be packaged without removing excess liquor, but this is a less desirable practice.

If the proper raw materials and processing facilities are available, fresh vegetables and/or meat are continuously processed from the raw state to the final packaging operation. Such operation eliminates costly dehydration with attendant loss of desirable flavor components and the need for subsequent rehydration.

The invention will be further illustrated by several examples. In the examples, all parts are by weight and all percentages are by weight, all temperatures are in degrees Farenheit unless otherwise specified.

EXAMPLE 1

Instant chicken noddle soup mix

Noodles, measuring about 16 mm. x 1 mm. x 1 mm., were cooked in six parts of a liquor of the following composition to one part of noodles.

| Ingredient: | Parts by wt. |
|---|---|
| Water | 93.785 |
| Salt | 2.000 |
| Spirit vinegar (100 grain strength) | 4.000 |
| Sorbic acid | 0.200 |
| Calcium disodium salt of ethylenediaminetetraacetic acid | 0.015 |

The liquor was brought to a brisk boil, the noddles added and cooked for six minutes. Following the cooking operation, the noodles were drained and weighed. The drained noodles, now measuring about 20 mm. x 2 mm. x 1.5 mm., were packed while hot in a moisture-proof sealed envelope. It is preferable to pack the noddles while at a temperature greater than 150° F., preferably greater than 160° F., this temperature being adequate to prevent any microbiological spoilage in the packed moist noodles containing the sorbic acid, ethylenediaminetetraacetic acid component and the acetic acid uniformly dispersed throughout the noodles.

Plain noodles have a pH of about 6.1. The noodles cooked in the manner described above had a pH of about 3.8. Packing at this pH, preferably hot, in wet form with occluded liquor from the above cooking liquor provides microbiological and organoleptic stability to the noodles.

In order to regain the pH of a conventional soup on rehydration (pH of conventional soup is about 5–7.5) the alkalizing ingredient such as trisodium phosphate is included in the dry soup mix which is packed separately. The trisodium phosphate included in the basic mix neutralizes for the most part, the acid absorbed by the noodles; for each 100 parts of the reconstituted noodles (equivalent to 20 to 25 parts by weight of the original dehydrated noodles), 1.5 grams of the trisodium phosphate was used for the neutralization.

The basic soup mix made of the following ingredients in the proportions specified was readily soluble and dispersible in hot water.

| Ingredient: | Parts by wt. |
|---|---|
| Dextrose and/or other sugars | 32 |
| Monosodium glutamate | 15 |
| Vegetable protein hydrloysate | 2 |
| Chicken fat and hydrogenated vegetable oil | 20 |
| Salts, spices, and other flavoring ingredients | 24 |
| Trisodium phosphate | 7 |

This basic soup mix was packed in a separate moisture-proof sealed envelope. For every ounce of the above basic soup mix that was packed, 4.5 ounces of the hydrated noodles were packed in a separate moisture-proof sealable envelope. This envelope and the one containing the cooked noodles were packed in a cardboard carton.

In making the instant chicken noodle soup the contents of both envelopes were placed in a large bowl. Three cups of boiling water were added and a ready-to-serve soup was instantly available following stirring of about 30 seconds. The pH of the final soup was 6.4.

EXAMPLE 2

Instant minestrone soup

The pasta portion and soup base portion (beef fat replacing chicken fat) were prepared in the same manner as the materials for Example 1. The pasta were small varied pieces measuring about 8 to 20 mm. in length and 1 mm. in wall thickness; after cooking, these measured about 10 to 25 mm. in length and 2.5 mm. in wall thickness. In addition, the food of gross particulate size included a vegetable component also cooked in a reconstitution liquor. The vegetable component after rehydration and the reconstitution liquor that was employed for this purpose, were as follows:

| Vegetable component (rehydrated basis): | Parts by wt. |
|---|---|
| White and french chopped onion | 16.47 |
| Green sweet pepper | 8.19 |
| Carrot | 8.15 |
| Pimiento | 8.15 |
| Sweet relish | 8.11 |
| Reconstitution liquor for chopped vegetables: | |
| Water | 93.77 |
| Vinegar (100 grain, spirit) | 4.02 |
| Salt | 2.00 |
| Sorbic acid | 0.20 |
| Ethylenediaminetetraacetic acid as the calcium disodium salt | 0.01 |

The dehydrated chopped vegetables measured in excess of 5 mm. in maximum dimension and were less than 5 mm. in minimum dimension. Indeed, most of the vegetables, other than the pickle relish, measured less than 2 mm. in thickness. These vegetables were cooked for about 20 minutes in 6.5 parts of liquor of the above composition per part of the vegetable material. The vegetables were drained after cooking and while hot were incorporated with the hot drained pasta in equal parts and packed as in Example 1.

For each 4.5 ounces of the mixture of hydrated pasta and hydrated vegetable, 1 ounce of the basic soup mix was packed in a separate moisture-proof sealed envelope. This envelope and the one containing the food of gross particulate size were packed in a cardboard carton.

In making the instant minestrone soup, the contents of both envelopes were placed in a large bowl. Three cups of boiling water were added and a ready-to-serve soup was instantly available, following stirring of about 30 seconds. The pH of the final soup was 6.

EXAMPLE 3

Instant vegetable soup

Rehydrated vegetables were prepared as follows. A dehydrated vegetable mix was rehydrated and cooked for about 20 minutes in 6.5 parts of a liquor composition, shown below, per 1 part of the chopped dehydrated vegetables. The latter measured in excess of 5 mm. in maximum dimension and were less than 2 mm. in thickness, with only a small increase in dimensions on cooking and hydration.

| Vegetable component (rehydrated basis): | Parts by wt. |
|---|---|
| French onion | 29.33 |
| White onion | 27.07 |
| Green pepper | 22.51 |
| Carrot | 21.09 |
| Reconstitution liquor for chopped vegetables: | |
| Water | 93.77 |
| Vinegar (100 grain, spirit) | 4.02 |
| Salt | 2.00 |
| Sorbic acid | 0.20 |
| Ethylenediaminetetraacetic acid as the calcium disodium salt | 0.01 |

After the reconstitution period, the vegetables weighed about 4.5 times as much as the dehydrated vegetables. The vegetables were then drained and packed hot, at a temperature in excess of 150° F., in a moisture-proof sealed envelope.

The mixed vegetables of the type used in this example normally have a pH of about 5.7 while the vegetables prepared in the manner described above had a pH of 3.8. In order to regain the pH of a conventional soup on rehydration, the alkaline ingredient trisodium phosphate was included in the separately packaged basic soup mix. The trisodium phosphate included in the basic soup mix neutralizes the acid absorbed by the vegetables. For each 100 parts of the reconstituted vegetables, 1.5 grams of the trisodium phosphate are used for the neutralization.

The separately packaged basic soup mix was the same as that of Example 2. For every ounce of the basic soup mix there was packed 4.5 ounces of the hydrated vegetables in a separate moisture-proof sealed envelope. The two envelopes were packed in a cardboard carton.

The instant vegetable soup of this example was prepared for eating in the same manner as the soup of Example 1. The pH of the final soup was 5.8.

EXAMPLE 4

Instant vegetable soup

A product exactly the same as that described in Example 3 was prepared but this time fresh vegetables of the size indicated were cooked for 4 minutes at 250° F. in a pressurized vessel, in an equal volume of the following solution:

| Component: | Parts by wt. |
|---|---|
| Water | 91.73 |
| Vinegar (100 grain, spirit) | 5.00 |
| Salt | 3.00 |
| Potassium sorbate | 0.25 |
| Disodium salt of ethylenediaminetetraacetate | 0.02 |

The drained vegetables, in the cooked state, weighed the same as in the fresh raw state and were in the same ratio to each other as shown for the vegetables on a rehydrated basis in Example 3.

The packaging of the hot cooked vegetables, subsequent preparation of the soup for eating, and pH of the soup were the same as that described in Example 3.

EXAMPLE 5

Instant beef and vegetable soup

The following fresh raw components were blended and cooked in an equal volume of a liquor, shown below; cooking time was 20 minutes in a covered kettle at atmospheric pressure.

| Component: | Parts by wt. |
|---|---|
| Beef chips | 30.00 |
| French onion | 29.33 |
| White onion | 27.07 |
| Green pepper | 22.51 |
| Carrot | 21.09 |

The beef chips were about 7 mm. square and about 3 mm. thick. The vegetable components measured in excess of 5 mm. in maximum dimension and were about 1.5 mm. in thickness. The cooking liquor had the following composition:

| Component: | Parts by wt. |
|---|---|
| Water | 90.28 |
| Vinegar (100 grain, spirit) | 7.50 |
| Salt | 2.00 |
| Benzoic acid | 0.20 |
| Ethylenediaminetetraacetic acid | 0.02 |

The cooked food components were drained and packed while hot in a moisture-proof sealed envelope. The pH of the components was 4.0. In order to regain the pH of a conventional soup on rehydration the basic soup mix contained added trisodium phosphate. The composition of the basic soup mix was as follows:

| Ingredient: | Parts by wt. |
|---|---|
| Dextrose and/or other sugars | 32 |
| Monosodium glutamate | 15 |
| Vegetable protein hydrolysate | 2 |
| Beef fat and hydrogenated vegetable oil | 20 |
| Salt, spices and other flavoring ingredients | 22 |
| Trisodium phosphate | 7.5 |

This basic soup mix was packed in a separate moisture proof sealed envelope. For every ounce of the above basic soup mix that was packed, 5 ounces of the cook beef and vegetable mixture were packed in a separate moisture-proof sealed envelope. The two envelopes were packed in a cardboard carton.

In making the instant beef and vegetables soup the contents of both envelopes were placed in a large bowl. Three cups of boiling water were added and a ready-to-serve soup was instantly available following stirring of about 30 seconds. The pH of the final sotup was 6.

EXAMPLE 6

Instant potato soup—chunk style

Potatoes were prepared as follows. Whole potatoes were washed and peeled by a conventional abrasive peeler after which the eyes and blemishes were removed by hand. The potatoes were then sliced and cross cut to provide pieces about 10 mm. square and 3 mm. in thickness. The potatoes were then rinsed and weighed in a stainless steel perforated basket and immersed in a kettle with a cover containing an equal weight of boiling liquor of the following composition.

| Ingredients: | Parts by wt. |
|---|---|
| Water | 93.58 |
| Vinegar (100 grain, spirit) | 4.00 |
| Lactic acid (88% concentration) | 0.20 |
| Salt | 2.00 |
| Sorbic acid | 0.20 |
| Ethylenediaminetetraacetic acid as the calcium disodium salt | 0.02 |

After boiling was resumed, the potato pieces were cooked for about 20 minutes or until tender; weight remained substantially the same as the initial raw product. The basket containing the potatoes was then removed and excess cooking liquor drained off. The potatoes were packed while hot in a moisture-proof sealed envelope.

Potatoes normally have a pH of about 5.8 while the potatoes cooked in the manner described above had a pH of 4.0. As before, in order to regain the pH of a conventional soup on rehydration, the alkaline ingredient was included in the dry soup mix. For each 100 parts of cooked potatoes, 1.6 grams of trisodium phosphate are used for the neutralization.

The basic soup mix in this example was the same as that described in Example 5.

One ounce of the basic soup mix was packed in a large moisture-proof envelope for every 4.5 ounces of the hydrated potatoes packed in a separate moisture-proof sealed envelope. The envelopes were made of saran (polyvinylidene chloride) film. The two envelopes were then packed in one envelope consisting of saran film laminated to foil with an outer paper surface.

In making the instant potato soup the contents of both envelopes were placed in a large bowl with 3 cups of boiling water. After stirring for 30 seconds, the soup was ready for eating. The pH of the final soup was 5.8.

The present invention provides the following:

(1) A soup mix product of high convenience wherein only those foods of gross particulate size, and hence difficult to rehydrate from the dried state, are now provided in hydrated form.

(2) A soup mix product of high convenience but with the stability against microbiological and flavor deterioration the same as that attained with dehydrated soup mixes.

(3) A soup mix product of high convenience but packaged in low cost packaging materials, the same as those currently used for dehydrated soup mixes.

(4) A soup mix product of high convenience but light in weight since excessive water is not included; such packaged products are less costly to ship than the canned soups.

(5) A soup mix product which requires no cooking and is instantly prepared simply by adding boiling water to the mix in a bowl to provide a flavorful and organoleptically desirable soup; this degree of convenience cannot be attained today even with canned soups. Dehydrated soup mixes of the conventional type and containing foods of gross particulate size are very time consuming in their preparation.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

I claim:

1. A conveniently packaged food product for mixture and rehydration in hot water to form an instantly consummable soup containing foods of gross particulate size, comprising in combination, in a single unit:
    (a) a first moisture-proof sealed flexible package consisting of an easily rehydratable and substantially instantly dispersible dry soup base of small particulate size of less than about 2 millimeters; and
    (b) a second moisture-proof sealed flexible package consisting of a moist, ready-to-eat food adjunct of gross particulate size that is in microbiologically and organoleptically stabilized form requiring no further hydration,
the amount of said soup base and of said adjunct in each of said packages, respectively, being such as to permit their combination with a predetermined quantity of hot water to form a soup that is ready for consumption without cooking.

2. The food product of claim 1 wherein for each part of dry soup base there are present at least about 4 parts of moist ready-to-eat food adjunct, by weight.

3. The food product of claim 1 wherein the pH of the moist ready-to-eat food adjunct is less than about 4.5.

4. The food product of claim 3 wherein the dry soup base contains sufficient alkalizing agent to raise the pH of the consumable soup product to at least about 5.

5. The food product of claim 1 wherein the moist ready-to-eat food adjunct is selected from the group consisting of vegetables, potatoes, pasta, noodles, ham, beef and meat analogs.

6. A conveniently packaged food product for mixture and rehydration in hot water to form an instantly consumable soup comprising, in combination, in a single unit:
    (a) a first moisture-proof sealed package consisting of an easily rehydratable soup base having a moisture content less than about 5% and a particle size less than about 2 millimeters and consisting of sugar, monosodium glutamatte, protein hydrolyzate, flavoring compounds, and an alkalizing agent; and
    (b) a second moisture-proof sealed package consisting of a moist ready-to-eat food adjunct in gross particulate form selected from the group consisting of vegetables, potatoes, pasta, noodles, ham, beef and meat analogs, and mixtures thereof, said particules of adjunct having a size greater than about 5 millimeters in maximum dimension and less than about 3 millimeters in minimum dimension, said moist ready-to-eat food adjunct having a pH less than about 4.5,
the amounts in each of said packages being such that for each part of soup base there are 4 parts of moist ready-to-eat food adjunct.

7. The food product of claim 6 containing sufficient alkalizing agent to raise the pH of the final soup to at least about 5.

8. The food product of claim 7 wherein the alkalizing agent is selected from the group consisting of trisodium phosphate and trisodium citrate.

References Cited

UNITED STATES PATENTS

| | | | |
|---|---|---|---|
| 2,236,641 | 4/1941 | Karmen | (99—171CPD) |
| 2,910,367 | 10/1959 | Melnick | 99—150 |
| 2,971,850 | 2/1961 | Barton | 99—150X |
| 3,008,835 | 11/1961 | Madding | 99—171CPD |
| 3,077,262 | 2/1963 | Gaste | (99—171CPD) |
| 3,154,423 | 10/1964 | Voegeli | 99—222 |

FOREIGN PATENTS

| | | |
|---|---|---|
| 1,066,176 | 4/1967 | Great Britain. |

FRANK W. LUTTER, Primary Exminer
W. L. MENTLIK, Assistant Examiner

U.S. Cl. X.R.
99—171